Sept. 20, 1938.   J. R. GEDNETZ   2,130,755
JUICE EXTRACTOR
Filed April 4, 1936

INVENTOR.
John R. Gednetz
BY Joseph F. Westall
ATTORNEY.

Patented Sept. 20, 1938

2,130,755

UNITED STATES PATENT OFFICE 2,130,755

JUICE EXTRACTOR

John R. Gednetz, Los Angeles, Calif., assignor of one-half to Samuel R. Mercer, Los Angeles, Calif.

Application April 4, 1936, Serial No. 72,766

3 Claims. (Cl. 146—3)

This invention relates to fruit juice extractors, and specifically to means whereby the juices may be separated from the rind and pulp of the fruit by the manual oscillation of a reaming burr.

Articles of the prior art employing stationary extractors, depend upon oscillation of the fruit on the extractor to crush the juice-containing cells of the pulp. The soft character of the skin of many fruits and the requirement for both pressure and oscillation by one hand make extraction by this means and method extremely awkward and unsatisfactory. Uneven pressure on the rind compels the corrugations on the extractor to dig into or scrape off part of the inside lining of the rind or conversely fail to crush part of the pulp, resulting in inefficient and uneconomical separation.

A principal object of the present invention is to provide a device comprising a pitcher and reaming burr rotatably mounted relative to a base to enable extraction of the juice of halved fruit pressed upon the burr, by the rotation or oscillation of the pitcher.

Another object is the provision of a device comprising a unitary reaming burr and pitcher, having a socket in its bottom for the engagement of a bearing vertically mounted on a base, whereby the pitcher and base may be rotatably and removably associated, and having incorporated therewith resilient means to normally maintain attachment of the base and pitcher to permit the base to be raised with the pitcher when it is desired to pour juice therefrom, but which may be manually separated to facilitate cleansing.

Another object is to provide a pitcher having a reaming burr integrally mounted therewith and a base for the oscillatory support thereof, said pitcher being adaptable to artistic design for independent use relative to the base.

Other objects and corresponding advantages will be apparent from the detailed description hereinafter contained, taken in view of the accompanying drawing in which.

Figure 1:
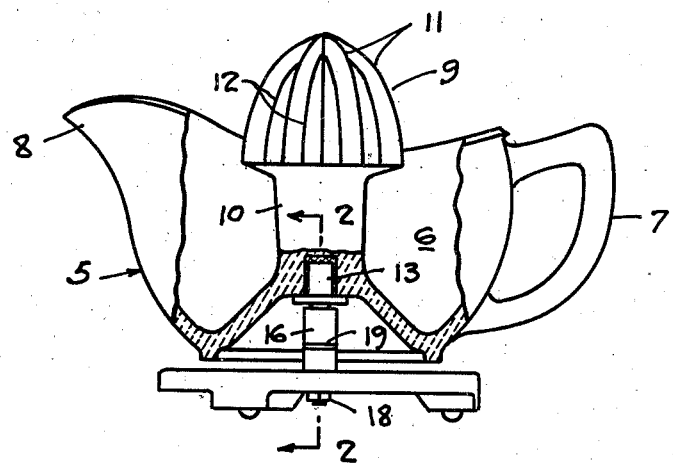
Fig. 1 is a sectional view of my invention.
Figure 2:
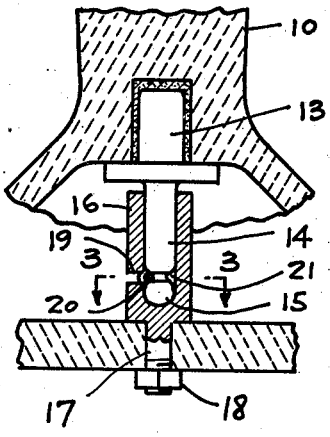
Fig. 2 is a fragmentary section on line 2—2 of Fig. 1.
Figure 3:
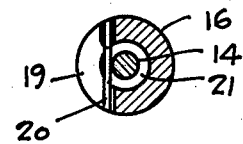
Fig. 3 is a sectional view on line 3—3 of Fig. 2.

Referring to the drawing in detail, the numerals of which indicate similar parts throughout the several views, 5 designates generally a pitcher comprising a bowl 6 and a handle 7, said bowl having a spout 8 through which juice extracted from fruit by means hereinafter described, may be poured.

A reaming burr 9 is centrally mounted within the bowl so as to extend above the edge thereof, on a shank 10, which is preferably molded integrally with the bottom of the bowl. Burr 9 is provided with the usual ribs 11 which function to grate the pulp of a half-portion of fruit pressed thereagainst during oscillation of the pitcher, as will be made obvious. Recesses 12 alternating with ribs 11 on the burr provide channels through which the juice thus separated flows down shank 10 into bowl 6.

Bowl 6 is provided with a concave bottom into the center of which a stud 13 is secured by any means well known in the art, dependable largely upon the composition of the pitcher. Integrally formed with stud 13 and protruding downwardly into the concavity is a spindle 14 terminating above the bottom of the pitcher in a rounded end portion 15.

16 indicates a vertical thrust bearing mounted on a base 17 by a pin which extends through the base and is secured by a nut 18. The depth of bearing 16 and the length of spindle 14 are relatively proportioned to permit rotatable support of the pitcher on the base.

Slightly above the horizontal bearing surface of bearing 16 a slot 19 is cut which intersects the bore thereof. At one end of slot 19 a spring finger 20 is secured, its opposite end extending normally to the other end of the slot, thus forming a chord through the bore of the bearing. Spaced from the lower end of spindle 14 an annular groove 21 is provided so as to correspond, when the spindle is in operative position in the bearing, with the spring finger 20.

The operation of the device will now be briefly described: The pitcher and base are assembled by inserting the spindle into the bearing and exerting sufficient pressure to enable the rounded end portion 15 of the spindle to pass spring finger 20 and cause the engagement of the finger in annular groove 21. The pulp of a half portion of fruit is then firmly pressed against reaming burr 9. The handle of pitcher 5 is grasped with the other hand and the bowl and burr oscillated, grating the pulp and crushing the juice therefrom. As the spring finger 20 will resiliently maintain the attachment of the pitcher with the base under ordinary operating conditions, any part of the contents of the bowl may be poured out without disengaging the base. The pitcher may, however, be separated by exerting sufficient pull to force the finger 20 from the bore of the bearing.

What I claim and desire to secure by Letters Patent is:

1. In a juice extractor, a pitcher, a reaming burr secured within said pitcher, an annularly-grooved spindle secured to the bottom of said pitcher in axial alignment with said burr, a base having a bearing for said spindle, so as to rotatively support said pitcher, a slot in said bearing intersecting the bore thereof, and a spring finger secured to one side of said slot adapted to engage in the groove of said spindle while the bearing is supporting said pitcher.

2. In a device of the character described, a base, a bearing comprising a cylindrical member mounted on said base, means to close one end of said member shaped to form a rounded bearing surface within said member, a pitcher having a burr therein, a spindle secured to the underside of said pitcher extending into said member and supported on said bearing surface, the surface of the end of said spindle contacting said bearing surface being parallel to said bearing surface, said spindle having an annular groove thereon, said member having a slot in its bore, a resilient pin secured in said slot normally extending into said groove of said spindle to releasably retain said spindle in contact with said bearing surface.

3. In a device of the character described, a base, a member having a circular bore mounted on said base, means forming a thrust-bearing surface in said member, a pitcher having a burr therein, a spindle secured to the underside of said pitcher extending into said member supported on said bearing surface, said spindle having an annular groove therein, the inner wall of said member having a recess therein, and a spring secured to said member to resiliently and releasably engage the wall of said spindle forming said groove to normally retain said spindle on said bearing surface.

JOHN R. GEDNETZ.